United States Patent
Ash et al.

(10) Patent No.: US 7,627,714 B2
(45) Date of Patent: Dec. 1, 2009

(54) APPARATUS, SYSTEM, AND METHOD FOR PREVENTING WRITE STARVATION IN A PARTITIONED CACHE OF A STORAGE CONTROLLER

(75) Inventors: Kevin John Ash, Tucson, AZ (US); Matthew Joseph Kalos, Tucson, AZ (US); Robert Akira Kubo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/466,426

(22) Filed: Aug. 22, 2006

(65) Prior Publication Data
US 2008/0052456 A1  Feb. 28, 2008

(51) Int. Cl.
*G06F 12/00* (2006.01)
(52) U.S. Cl. .................................... 711/113; 711/129
(58) Field of Classification Search .................. 711/113, 711/129
See application file for complete search history.

(56) References Cited

U.S. PATENT DOCUMENTS

| | | | |
|---|---|---|---|
| 4,503,501 A * | 3/1985 | Coulson et al. | 711/129 |
| 5,307,473 A * | 4/1994 | Tsuboi et al. | 711/143 |
| 5,544,340 A | 8/1996 | Doi et al. | 395/445 |
| 6,032,216 A | 2/2000 | Schmuck et al. | 710/200 |
| 6,775,738 B2 | 8/2004 | Ash et al. | 711/113 |
| 2003/0037204 A1 * | 2/2003 | Ash et al. | 711/113 |
| 2004/0205206 A1 * | 10/2004 | Naik et al. | 709/230 |
| 2005/0071599 A1 * | 3/2005 | Modha et al. | 711/170 |
| 2007/0088930 A1 * | 4/2007 | Matsuda et al. | 711/170 |

FOREIGN PATENT DOCUMENTS

CN  1554050  12/2004

* cited by examiner

*Primary Examiner*—Brian R Peugh
*Assistant Examiner*—Hashem Farrokh
(74) *Attorney, Agent, or Firm*—Kunzler & McKenzie

(57) ABSTRACT

An apparatus, system, and method are disclosed for preventing write starvation in a storage controller with access to low performance storage devices. A storage device allocation module is included to assign a storage device write cache limit for each storage device accessible to a storage controller. The storage device write cache limit comprises a maximum amount of write cache of the storage controller available to a storage device for a write operation. At least one storage device comprises a low performance storage device and a total amount of storage available to the storage devices comprises an amount greater than a total storage capacity of the write cache. A low performance write cache limit module is included to set a low performance write cache limit. The low performance write cache limit comprises an amount of write cache available for use by the at least one low performance storage device for a write operation. The amount of write cache available to the at least one low performance storage device comprises an amount less than the total storage capacity of the write cache.

18 Claims, 5 Drawing Sheets

APPARATUS, SYSTEM, AND METHOD FOR PREVENTING WRITE STARVATION IN A PARTITIONED CACHE OF A STORAGE CONTROLLER

BACKGROUND OF THE INVENTION

1. Field of the Invention

This invention relates to managing write cache in a storage controller and more particularly relates to preventing write starvation in a partitioned write cache of a storage controller.

2. Description of the Related Art

The present invention is an improvement over the prior art, which includes the patent to Kevin J. Ash, U.S. Pat. No. 6,775,738, issued Aug. 10, 2004, which is hereinafter incorporated by reference. Storage controllers such as the Enterprise Storage Server® from International Business Machines manage storage requests and retrieval from host computers on a network to one or more storage devices. Storage devices may include hard disk drives in various forms such as a Direct Access Storage Device ("DASD"), a Redundant Array of Inexpensive/Independent Disks ("RAID"), and Just a Bunch of Disks ("JBOD"). A storage controller may also access other storage devices such as tape drives, optical drives, and the like.

Storage controllers typically include general cache memory (cache), which is volatile memory where the contents are lost if power is lost to the storage controller, upon reboot, etc. In addition, many storage controllers include a write cache in the form of non-volatile storage ("NVS") that includes some form of backup power, such as a battery, to prevent loss of the contents upon loss of power, reboot, etc.

Typically, when a storage controller receives a request to store a file update or a complete file onto a storage device accessible to the storage controller, the storage controller uses a fast write operation to the data. In a fast write operation, the storage controller writes one copy of the file update or complete file to the cache and one to the write cache and then notifies the host that the write process is complete. (For simplicity, hereafter the term update includes a file update, a complete file, or any other data requested to be stored on a storage device.) The storage controller then uses a destage process to copy the update from the cache to the target storage device. A fast write process is more efficient than maintaining a connection to a host while the update is written to the target storage device.

A copy of the update is stored in the write cache to ensure that the update is not lost if a power failure, system reboot, or other problem causes the contents of the cache to be lost prior to destaging the update to the target storage controller. After the update is destaged to the storage device, the location of the update in the cache and the write cache may be allocated for another use. Typically the write cache has a substantially smaller storage space than the cache available for write operations.

Without any limitations on how much write cache could be used in a storage request, a storage device may dominate usage of the write cache to the detriment of other hosts requesting storage of an update. For example, where there are multiple storage devices connected to the storage controller, such as a RAID array, the cache and write cache may store updates intended for the multiple storage devices. In the event that the write cache is substantially filled with updates for one target storage device and that target storage device fails, then complete status cannot be returned for writes directed toward the surviving storage devices if the write cache is filled with the data from the failed storage device. Complete status is not returned unless the update is copied to both cache and the write cache.

In another example, a storage device may dominate the write cache if the storage device processes storage requests at a slow rate. Other processes submitting storage requests may be delayed to the extent that updates are destaged to the slower, dominating storage device. Destage operations to a dominating storage device may be running at a slow rate if one or more disk drives in the storage device are being rebuilt as a result of a failed drive or if the updates to the dominating storage device in the write cache comprise mostly random (non-sequential) updates. Random updates may take longer to destage because they have longer disk access times and, in a RAID environment, require constant parity recalculations for each random update. One or more storage devices dominating the write cache and causing a delay in processing other storage requests may be termed write starvation.

An improvement was presented in the referenced patent to Ash (hereinafter "Ash"). In Ash, the storage devices accessible to a storage controller are allotted a maximum percentage of write cache that may be used by a storage device. First, the number of storage devices accessible to a storage controller is determined. A storage device write cache limit (NVS threshold) is then assigned to each rank. A rank may comprise a single storage device or a group of storage device, for example in a RAID array or JBOD. Each rank may then be assigned a uniform storage device write cache limit or each rank may be assigned a different storage device write cache limit.

For efficiency, the amount of write cache available to each rank may total more than 100% of the available write cache. Typically, if there are four or more ranks, the storage device write cache limit for each rank is 25%. Limiting the availability of write cache for a rank helps to solve the problem of a storage device or rank dominating the write cache and causing write starvation. However, the introduction of high capacity, low cost nearline storage devices presents an additional challenge in preventing write starvation of write cache. Nearline storage devices are a compromise between online storage devices and offline storage devices. Online storage devices may be characterized as having constant, very rapid access to data. Offline storage devices are characterized by infrequent access for backup purposes or long term storage.

Nearline storage devices, such as fiber channel ATA (Advanced Technology Attachment) drives or serial ATA drives, are attractive due to their low cost per byte. However, nearline storage devices have a different reliability characteristic than online, server-class storage devices which expose the nearline storage devices to failures when a server-class storage device workload is applied. Nearline storage devices compensate for their limitations by adjusting their operating behavior based on workload. To limit stress on mechanical parts and prevent subsequent failures of nearline storage devices, vendors have implemented methods to throttle the device activity. Throttling of device activity limits mechanical stress, but degrades time response characteristics and performance.

The introduction of nearline storage devices into the partitioned cache system described above creates a situation where write starvation may occur. If multiple nearline storage devices are accessible to a storage controller, while each may be limited by an allotted storage device write cache limit, the combination of nearline storage devices may each use their allotted write cache and cause write lockup. For example, four or more nearline storage devices may be accessible to a storage controller and have a storage device write cache limit of 25%. As the workload increases on the nearline devices, the nearline storage devices may start to throttle back. As the nearline storage devices throttle back, destaging to the nearline storage devices takes more time than optimum operation and each nearline storage device under load may then take up more write cache. Each of four nearline storage devices may take up to 25% of the write cache and dominate the entire write cache.

From the foregoing discussion, it should be apparent that a need exists for an apparatus, system, and method that prevent write starvation for a storage controller with access to nearline, low performance storage devices. Beneficially, such an apparatus, system, and method would limit the amount of write cache available to nearline, low performance storage devices accessible to a storage controller.

SUMMARY OF THE INVENTION

The present invention has been developed in response to the present state of the art, and in particular, in response to the problems and needs in the art that have not yet been fully solved by currently available storage controllers. Accordingly, the present invention has been developed to provide an apparatus, system, and method for preventing write starvation in a storage controller with access to low performance storage devices that overcome many or all of the above-discussed shortcomings in the art.

A method of the present invention is presented for preventing write starvation in a storage controller with access to low performance storage devices. The method in the disclosed embodiments substantially includes the steps necessary to carry out the functions presented below with respect to the operation of the described apparatus and system. In one embodiment, the method includes assigning a storage device write cache limit for each storage device accessible to a storage controller. The storage device write cache limit comprises a maximum amount of a write cache of the storage controller available to a storage device for a write operation. At least one storage device comprises a low performance storage device and a total amount of storage available to the storage devices comprises an amount greater than a total storage capacity of the write cache.

The method includes setting a low performance write cache limit. The low performance write cache limit comprises an amount of write cache available for use by the at least one low performance storage device for a write operation. The amount of write cache available to the at least one low performance storage device comprises an amount less than the total storage capacity of the write cache. In one embodiment, the low performance storage device comprises a storage device configured to decrease performance in response to a heavy workload. In another embodiment, the low performance storage device comprises a nearline storage device. In another embodiment, the write cache comprises non-volatile storage.

The method also may include receiving a request to store an update to a low performance storage device, storing the update in the write cache in response to the size of the update plus an amount of the write cache occupied by updates ready to be written to the low performance storage device being less than or equal to the storage device write cache limit and the size of the update plus an amount of the write cache occupied by updates ready to be written to the low performance storage devices accessible to the storage controller being less than or equal to the low performance write cache limit, and writing the update to the low performance storage device. In another embodiment, the method includes receiving a request to store an update to a low performance storage device and delaying storage of the update in response to either the size of the update plus an amount of the write cache occupied by updates ready to be written to the low performance storage device being greater than the storage device write cache limit, or the size of the update plus an amount of the write cache occupied by updates ready to be written to the low performance storage devices accessible to the storage controller being greater than the low performance write cache limit. In another embodiment, delaying storage of the update includes queuing reconnect parameters required to reconnect a host requesting the update and disconnecting from the host.

In a further embodiment, at least one storage device comprises a Redundant Array of Inexpensive Disks ("RAID") array. In another embodiment, the maximum amount of write cache available to each storage device is greater than the total storage capacity of the write cache divided by a total number of storage devices accessible to the storage controller. In another embodiment, the storage device write cache limit of each storage device accessible to the storage controller includes an equal amount for each storage device. In yet another embodiment, the storage device write cache limit of each storage device accessible to the storage controller comprises a different limit for each storage device. In one embodiment, the storage device write cache limit of a storage device is limited to 25% of the total storage capacity of the write cache when four or more storage devices are accessible to the storage controller. In another embodiment, the low performance write cache limit does not exceed half of the total storage capacity of the write cache when two or more low performance storage devices are accessible to the storage controller.

The apparatus to prevent write starvation in a partitioned cache of a storage controller is provided with a plurality of modules configured to functionally execute the necessary steps of assigning a storage write cache limit and a low performance write cache limit. These modules in the described embodiments include a storage device allocation module that assigns a storage write cache limit for each storage device accessible to a storage controller. The storage device write cache limit comprises a maximum amount of write cache of the storage controller available to a storage device for a write operation. At least one storage device comprises a low performance storage device and a total amount of storage available to the storage devices comprises an amount greater than a total storage capacity of the write cache. The apparatus includes a low performance write cache limit module that sets a low performance write cache limit. The low performance write cache limit comprises an amount of write cache available for use by the at least one low performance storage device for a write operation. The amount of write cache available to the at least one low performance storage device comprises an amount less than the total storage capacity of the write cache.

The apparatus, in one embodiment, is configured to include a request module that receives a request to store an update to a low performance storage device, a write cache storage module that stores the update in the write cache, and a destage module that destages the update to the low performance storage device. The write cache storage module stores the update in the write cache in response to the size of the update plus an amount of the write cache occupied by updates ready to be written to the low performance storage device being less than or equal to the storage device write cache limit, and the size of the update plus an amount of the write cache occupied by updates ready to be written to the low performance storage devices accessible to the storage controller being less than or equal to the low performance write cache limit. In one embodiment, the storage controller includes a volatile cache, and the write cache storage module stores a copy of the update in the write cache and a copy of the update in the volatile cache and the destage module destages the update to the low performance storage device from the volatile cache.

The apparatus is further configured, in one embodiment, to include a delay module that delays storage of the update in response to either the size of the update plus an amount of the write cache occupied by updates ready to be written to the low performance storage device being greater than the storage device write cache limit, or the size of the update plus an amount of the write cache occupied by updates ready to be written to the low performance storage devices accessible to the storage controller being greater than the low performance write cache limit.

A system of the present invention is also presented to prevent write starvation in a storage controller with access to low performance storage devices. The system may be embodied by a plurality of storage devices, wherein at least one of the storage devices comprises a low performance storage device and a storage controller connected to the plurality of storage devices. In particular, the storage controller, in one embodiment, includes a storage device allocation module that assigns a storage write cache limit for each storage device accessible to the storage controller. The storage device write cache limit comprises a maximum amount of write cache of the storage controller available to a storage device for a write operation. At least one storage device comprises a low performance storage device and a total amount of storage available to the storage devices comprises an amount greater than a total storage capacity of the write cache.

The storage controller includes a low performance write cache limit module that sets a low performance write cache limit. The low performance write cache limit comprises an amount of write cache available for use by the at least one low performance storage device for a write operation. The amount of write cache available to the at least one low performance storage device comprises an amount less than the total storage capacity of the write cache. The system may further include a host with access to at least one of the storage devices through the storage controller for writing updates to the at least one storage device. In one embodiment, a host communicates with the storage controller over a storage area network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
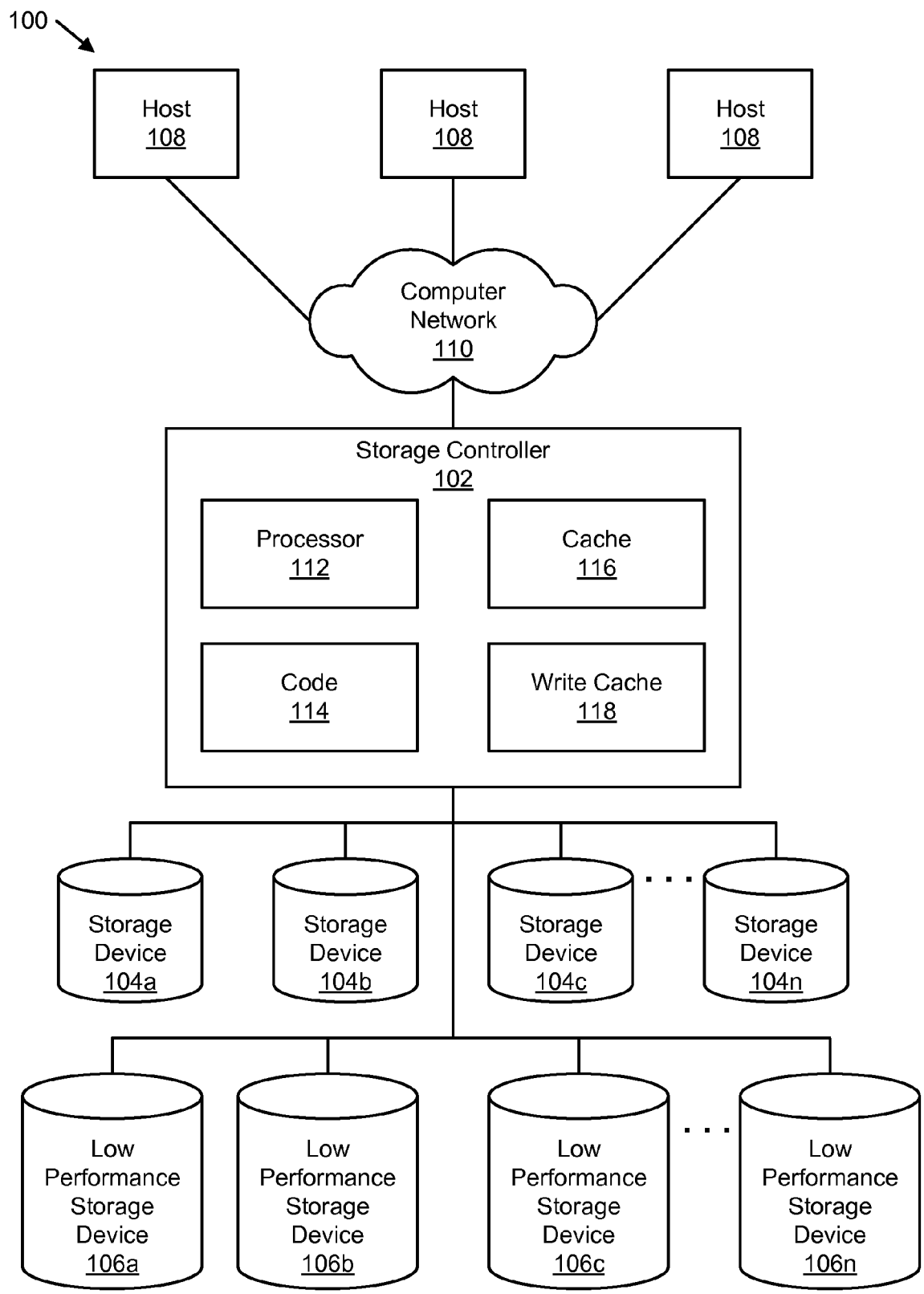
FIG. 1 is a schematic block diagram illustrating one embodiment of a system to prevent write starvation in a storage controller with access to low performance storage devices in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a schematic block diagram illustrating one embodiment of a system 100 to prevent write starvation in a storage controller with access to low performance storage devices in accordance with the present invention. The system 100 includes a storage controller 102, with access to storage devices 104, 106, some of which are low performance storage devices 106. The storage controller 102 is in communication with one or more hosts 108 through a computer network 110. The storage controller 102 includes a processor 112, computer code 114, a cache 116, and write cache 118. The devices and components are described below.

The system 100 includes a storage controller 102. The storage controller 102 may be part of an Enterprise Storage Server® or a similar server or system. The storage controller 102 may comprise a single computer or a network of computers. The storage controller 102 may be part of a file server or may be an independent computer. The storage controller 102 accesses a number of storage devices 104, 106. The storage controller 102 may access the storage devices 104 over a storage area network ("SAN"), a wide area network, a local area network, a fiber channel network, the Internet, or the like.

The storage devices 104, 106 include a number of low performance storage devices 106a, b, . . . n. The system 100 includes at least one low performance storage device 106a. The storage devices are typically hard disk drives, but may also include flash memory, optical drives, tape drives, a RAID array, a JBOD, a DASD, etc. The low performance drives 106 may be high capacity, low cost nearline drives. The low performance drives 106 may be nearline storage devices.

The low performance drives 106 typically have limited performance capabilities under a heavy work load. For example, the low performance drives 106 may throttle back during heavy load to operate at a reduced performance level. Reduced performance may include operating at a slower speed, allowing less read/write operations, etc. The low performance storage devices 106 may include fiber channel ATA and serial ATA storage devices. Other storage devices 104 are typically server-class devices and may not significantly reduce performance under load.

The storage controller 102 typically receives write requests from one or more hosts 108 connected through a computer network 110. A host 110 may be a server, a workstation, a personal computer, a mainframe computer, a laptop computer, or the like. The computer network 110 may include a wide area network, a local area network, a SAN, the Internet, a fiber channel network, and the like and may comprise a combination of network types. The computer network 110 may include integration servers, hubs, switches, cabling, routers, and the like.

The storage controller 102 includes a processor 112, such as a central processing unit ("CPU") executing code 114 to perform storage controller operations. The computer code 114 may be stored in random access memory ("RAM") or other location accessible to the processor 112. The storage controller 102 includes a cache 116. The cache 116 is typically volatile memory and may be used for write operations. The cache 116 may also be used for other operations necessary to the storage controller 102 operation.

The storage controller 102 also includes a write cache 118. The write cache 118, in one embodiment, is used for write operations and may be called a non-volatile storage ("NVS"). In one embodiment, the write cache 118 may be used for other input/output operations or other functions where it is desirable to not lose data upon power failure, reboot, or other event that causes loss of data in the cache 116. The write cache 118 may be maintained by a battery, an uninterruptible power supply, or the like, or may comprise a flash memory or other memory that maintains its contents in the absence of applied power. One of skill in the art will recognize other forms of write cache 118 capable of maintaining data in the absence of applied power.

Figure 2:
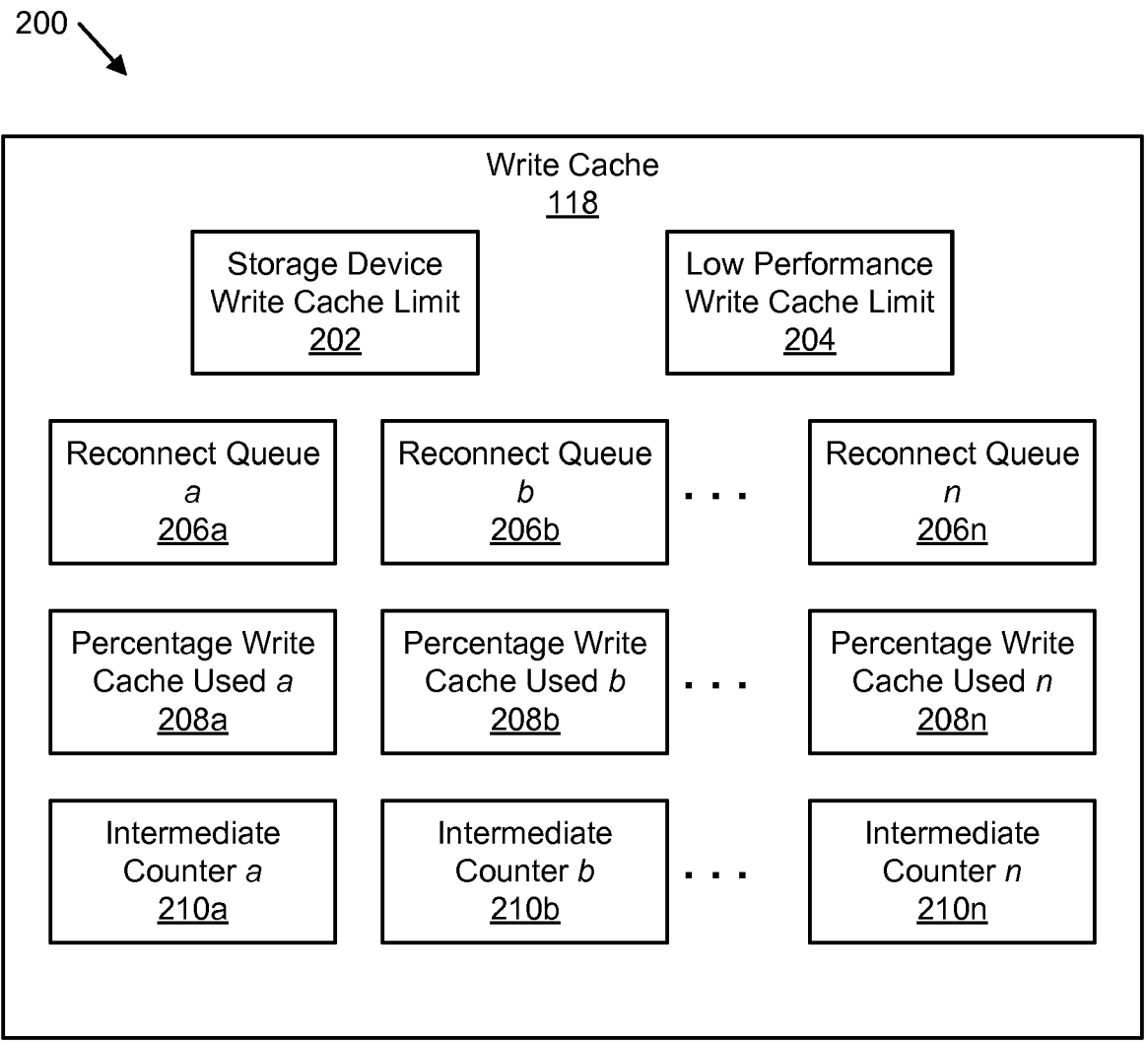
FIG. 2 is a schematic block diagram illustrating one embodiment of a cache of a storage controller with access to low performance storage devices and with an apparatus to prevent write starvation in the storage controller in accordance with the present invention.

FIG. 2 is a schematic block diagram illustrating one embodiment of a write cache 118 of a storage controller 102 with access to low performance storage devices 106 and with an apparatus to prevent write starvation in the storage controller 102 in accordance with the present invention. In one embodiment, the write cache 118 includes a storage device write cache limit 202 and a low performance write cache limit 204. The write cache 118 may also include reconnect queues 206a,b, . . . n, a percentage write cache used 208a,b, . . . n, and an intermediate counter 210a,b, . . . n for each storage device 104, 106 accessible to the storage controller 102.

The limits 202, 204, queues 206, percentage write cache used 208, and counters 210 may be located in the write cache 118 as shown or may be located elsewhere such as in the cache 116, external memory, RAM, or other location accessible to the processor 112. The limits 202, 204, queues 206, percentage write cache used 208, and counters 210 may be located together or separately. The limits 202, 204, queues 206, percentage write cache used 208, and counters 210 may be variables and may be located in a data structure, array, table, etc. In one embodiment, the limits 202, 204, queues 206, percentage write cache used 208, and counters 210 may not all be present. The limits 202, 204, queues 206, percentage write cache used 208, and counters 210 are described in more detail in the following figures.

Figure 3:
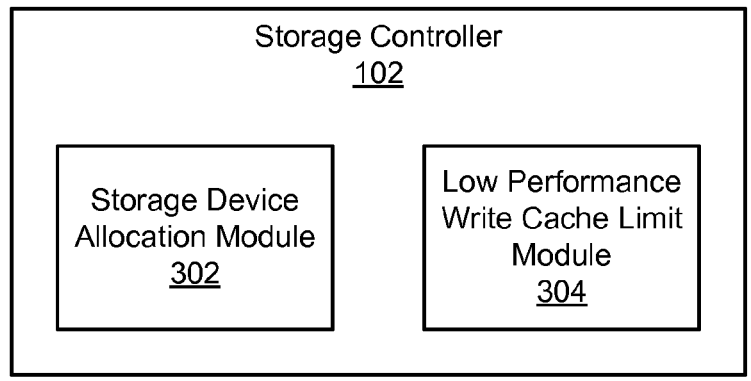
FIG. 3 is a schematic block diagram illustrating one embodiment of an apparatus to prevent write starvation in a storage controller with access to low performance storage devices in accordance with the present invention.

FIG. 3 is a schematic block diagram illustrating one embodiment of an apparatus 300 to prevent write starvation in a storage controller with access to low performance storage devices in accordance with the present invention. The apparatus 300 includes a storage controller 102 with a storage device allocation module 302 and a low performance write cache limit module 304, which are described below. The storage controller 102 is substantially similar to the storage controller 102 described in relation to FIG. 1.

The storage device allocation module 302 assigns a storage write cache limit 202 for each storage device 104, 106 accessible to the storage controller 102. The storage device write cache limit 202, in one embodiment, is a maximum amount of write cache 118 of the storage controller 102 available to a storage device 104, 106 for a write operation. In one embodiment, the storage device allocation module 302 assigns one the storage device write cache limit 202 for the storage devices 104, 106. In another embodiment, the storage device allocation module 302 assigns a unique storage device write cache limit 202 for each storage device 104, 106. The unique storage device write cache limit 202 may be the same value for some storage devices 104, 106.

In one embodiment, the storage device allocation module 302 assigns a storage device write cache limit 202 for a RAID array. In another embodiment, the storage device allocation module 302 assigns a storage device write cache limit 202 for each storage device 104, 106 in a RAID array. In another embodiment, the storage device allocation module 302 assigns a storage device write cache limit 202 for each storage device 104, 106 based on size of the storage device 104, 106. In yet another embodiment, the storage device allocation module 302 assigns a storage device write cache limit 202 based on a priority system. One of skill in the art will recognize other ways that a storage device allocation module 302 may assign a storage device write cache limit 202.

Typically, the apparatus 300 includes at least one low performance storage device 106. The low performance storage devices 106 may be nearline storage devices and are substantially similar to the low performance storage devices 106 described in relation to FIG. 1. Also, typically a total amount of storage available to the storage devices 104, 106 includes an amount greater than a total storage capacity of the write cache 118. Choosing the total amount of storage available to the storage devices 104, 106 is typically more efficient than dividing the storage space so the total allocated is less than or equal to the available space.

With many storage devices 104, 106 accessible to a storage controller 102, storage requests from a host 108 may require a storage device 104, 108 to be active for a time, requiring a significant portion of the cache 116 and write cache 118 for one or more write operations, but may then be inactive for a significant period of time. In one embodiment, the storage device allocation module 302 assigns a storage device write cache limit 202 of 25% of the size of the write cache 118 where there are four or more storage devices 104, 106 accessible to a storage controller 102. One of skill in the art will recognize other storage device write cache limits 202 based on storage devices 104, 106 accessible to a storage controller 102.

Where slow storage devices 104, 106 are accessible to the storage controller 102 a problem may arise where a slow storage device dominates write cache 118 and causes write starvation. Assigning a storage device write cache limit 202 alleviates the problem. However, when a group of nearline storage devices, or similar low performance storage device 106 is accessible to a storage controller 102, the group may all slow down under the work load typical of a storage controller 102. Although each low performance storage device 106 may be limited by a storage device write cache limit 202, the group may still dominate the write cache 118 and may cause write starvation.

For this reason, the apparatus 300 includes a low performance write cache limit module 304 that sets a low performance write cache limit 204. The low performance write cache limit 204, in one embodiment, includes an amount of write cache 118 available for use by the at least one low performance storage device 106 for a write operation. The amount of write cache 118 available to the low performance storage devices 106 includes an amount less than the total storage capacity of the write cache 118. Typically, when a group of low performance storage devices 106 is accessible to the storage controller 102, the group may dominate the write cache 1 8 due to throttling back performance under load or a similar action causing low performance. The low performance write cache limit module 304 sets a low performance write cache limit 204 such that the group of low performance storage devices 106 is prevented from dominating the write cache 118 and causing write starvation. In one embodiment, the low performance write cache limit module 304 sets a low performance write cache limit 204 of 50% of the size of the write cache 118. One of skill in the art will recognize other low performance write cache limits 204 suitable for a write cache 118 where a group of low performance storage devices 106 is accessible to a storage controller 102.

The low performance write cache limit 204 typically limits the amount of write cache 118 available for use by the low performance storage devices 106 accessible to the storage controller 102. Typically, an amount of write cache 118 used by a low performance storage device 106a is limited by an assigned storage device write cache limit 202 and the low performance write cache limit 204. For example, if a storage device write cache limit 202 assigned to a low performance storage device 106a is 25% and 10% of the write cache 118 has updates to be destaged to the low performance storage device 106a, a write request from a host 108 to store an update intended for the low performance storage device 106a will be accepted if the update takes less than 15% of the write cache 118. However, the low performance write cache limit 204 is set at 50% and 45% of the write cache 118 includes updates intended for the low performance storage devices 106a,b, . . . n, the update will not be accepted and will be delayed.

In one embodiment, the write cache 118 of the storage controller 102 includes a percentage of write cache used 208 variable. Each storage device 104, 106 has a percentage of write cache used variable 208a,b, . . . n. Each percentage of write cache used variable 208a,b, . . . n is used by the storage controller 102 to keep track of how much of the write cache 118 is filled with updates for a particular storage device 104, 106. In another embodiment, the write cache 118 of the storage controller 102 includes a reconnect queue 206a,b, . . . n for each storage device 104, 106. The reconnect queues 206 are used to store parameters for reconnecting to a host 108 if a write request is denied for some reason.

Figure 4:
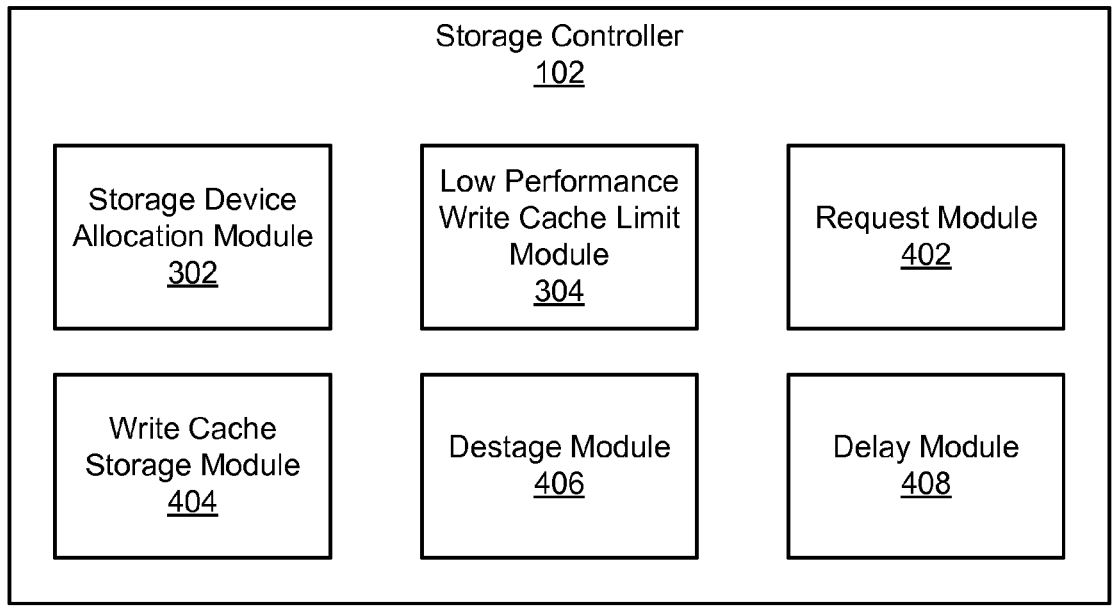
FIG. 4 is a schematic block diagram illustrating another embodiment of an apparatus to prevent write starvation in a storage controller with access to low performance storage devices in accordance with the present invention.

FIG. 4 is a schematic block diagram illustrating another embodiment of an apparatus 400 to prevent write starvation in a storage controller with access to low performance storage devices in accordance with the present invention. The apparatus 400 includes a storage controller 102 with a storage device allocation module 302 and a low performance write cache limit module 304 that are substantially similar to the storage controller 102 and modules described in relation the apparatus 300 of FIG. 3. In addition, the storage controller 102 includes a request module 402, a write cache storage module 404, a destage module 406, and a delay module 408, which are described below.

The storage controller 102 includes a request module 402 that receives a request to store an update to a low performance storage device 106a. A request to store an update is typically received from a host 108, but may also be received from any device in communication with the storage controller 102. An update may include a complete file, a portion of a file, or other request to store data on the low performance storage device 106a. Requests to store an update to one of the other storage devices 104 may be received in a similar manner. The request module 402 typically receives the update over the computer network 110.

The storage controller 102 includes a write cache storage module 404 that stores the update in the write cache 118. The write cache storage module 404 stores the update on condition that the size of the update plus an amount of the write cache 118 occupied by updates ready to be written to the low performance storage device 106a are less than or equal to the storage device write cache limit 202 and that the size of the update plus an amount of the write cache occupied by updates ready to be written to the low performance storage devices 106a,b . . . n accessible to the storage controller 102 are less than or equal to the low performance write cache limit 204. Where low performance storage devices 106 are present, typically both conditions are satisfied prior to the write cache storage module 404 storing the update in the write cache 118. In one embodiment, the write cache storage module 404 also stores the update in the cache 116. The write cache storage module 404 may use the percentage of write cache used variables 208 to keep track of an amount of write cache 118 in use.

The storage controller 102 includes a destage module 406 that destages the update to the low performance storage device 106a. The destage module 406 may also destage an update intended for other storage devices 104. In one embodiment, the write cache storage module 404 and the destage module 406 are part of a fast-write operation that returns a success status to the host 108 requesting a write operation and sending an update after the write cache storage module 404 stores the update in the write cache 118 and the cache 116. This type of write operation typically takes less time than an operation that returns success after an update is stored in a storage device 104, 106.

The storage controller 102 includes a delay module 408 that delays storage of the update. The delay module 408 delays storage of the update if one of two conditions is satisfied: the size of the update plus an amount of the write cache 118 occupied by updates ready to be written to the low performance storage device 106a is greater than the storage device write cache limit 202 or the size of the update plus an amount of the write cache 118 occupied by updates ready to be written to the low performance storage devices 106a,b . . . n accessible to the storage controller 102 is less than or equal to the low performance write cache limit 204. If either condition is met, the delay module 408 delays storage of the update.

In one embodiment, the reconnect queues 206 are used to store reconnect parameters when the delay module 408 delays a write request. When the delay module 408 determines that enough write cache 118 is available for a delayed update, the storage controller 102 reconnects to the host 108 sending the write request to allow the host 108 another opportunity to store the associated update in the write cache 118. One of skill in the art will recognize conditions when the storage controller 102 may reconnect to a host 108 to complete a write request.

In one embodiment, the write cache 118 includes intermediate counters 210a,b, . . . n for each storage device 104, 106 accessible to the storage controller 102. The intermediate counters 210 are intended to allow some updates when a situation arises that the storage device write cache limits 202 or the low performance write cache limit 204 are decreased and the percentage of write cache used 208 for one or more storage devices 104, 106 are substantially above the storage device write cache limits 202 or low performance write cache limit 204. The operation of the intermediate counter in relation to the storage device write cache limits 202 (NVS threshold 30) is described in detail in the Ash patent incorporated by reference (see FIG. 5 and associated text). The intermediate counters 210 may also be used in a similar way for the low performance write cache limit 204. In one embodiment, an intermediate counter 210n+1 (not shown) may be used in conjunction with the low performance write cache limit 204 and to track an amount of write cache 118 in use for updates intended for low performance storage devices 106. One of skill in the art will recognize other ways for a storage controller 102 to use intermediate counters 210 to allow some updates when an amount of write cache 118 used by one or more storage devices 104, 106 exceeds the storage device write cache limit 202 or low performance write cache limit 204 by a significant amount.

Figure 5:
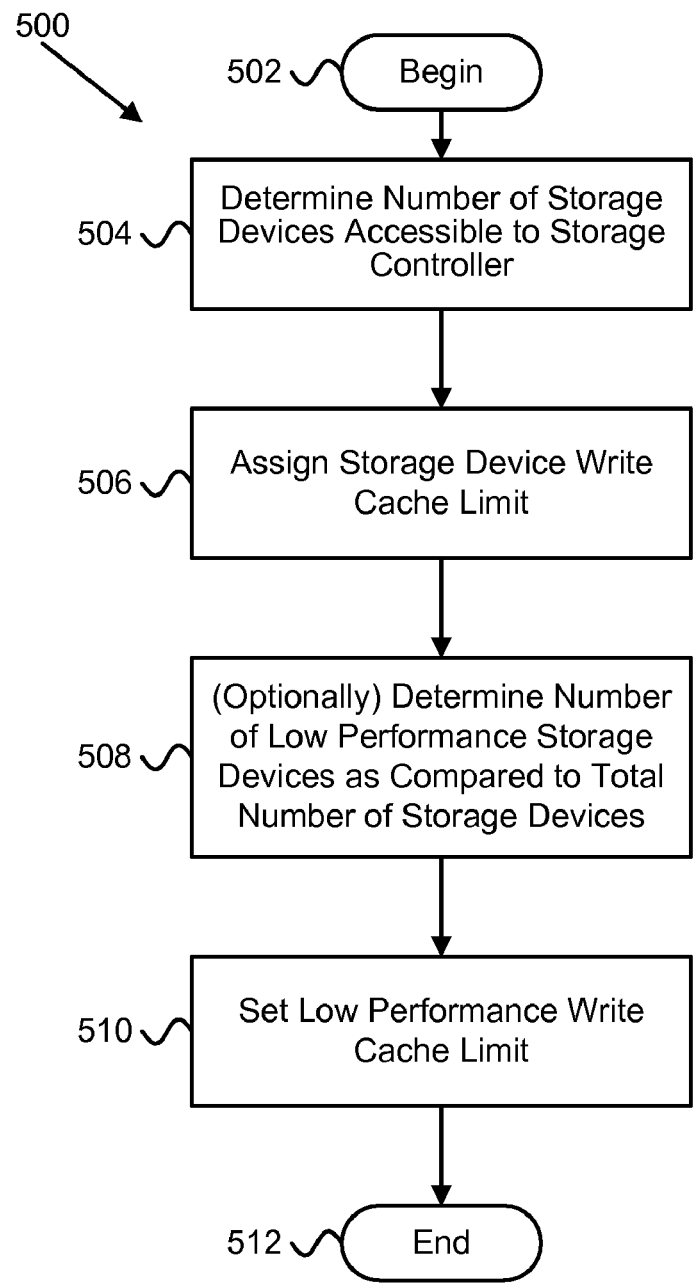
FIG. 5 is a schematic flow chart diagram illustrating one embodiment of a method for preventing write starvation in a storage controller with access to low performance storage devices in accordance with the present invention.

FIG. 5 is a schematic flow chart diagram illustrating one embodiment of a method 500 for preventing write starvation in a storage controller 102 with access to low performance storage devices 106 in accordance with the present invention. The method 500 begins 502 and the storage device allocation module 302 determines 504 the number of storage devices 104, 106 accessible to the storage controller 102. The number of storage devices 104, 106 may determine a number of ranks where each rank may be a storage device 104, 106 or a group of storage devices 104, 106 such as in a RAID array or JBOD. The storage device allocation module 302 assigns 506 a storage device write cache limit 204. In one embodiment, the storage device allocation module 302 assigns 506 one storage device write cache limit 204 for all ranks or storage devices 104, 106. In another embodiment, the storage device allocation module 302 assigns 506 a storage device write cache limit 204 for each storage device 104, 106 or rank based on size, priority, or other criteria.

In one embodiment, the low performance write cache limit module 304 determines 508 the number of low performance storage devices 106a,b, . . . n accessible to the storage controller 102. In one embodiment, the low performance write cache limit module 304 determines 508 the number of ranks of low performance storage devices 106, where some low performance storage devices 106 comprise a RAID array, JBOD, or the like. The low performance write cache limit module 304 sets 510 a low performance write cache limit 204 and the method 500 ends 512. The low performance write cache limit module 304 may set 510 a low performance write cache limit 204 independent of the number of low performance storage devices 106. The low performance write cache limit 204 is set 510 to less than the size of the write cache 118 to prevent write starvation. In one embodiment, the low performance write cache limit 204 is set to 50% of the size of the write cache 118. One of skill in the art will recognize other criteria for setting 510 the low performance write cache limit 204.

Figure 6:
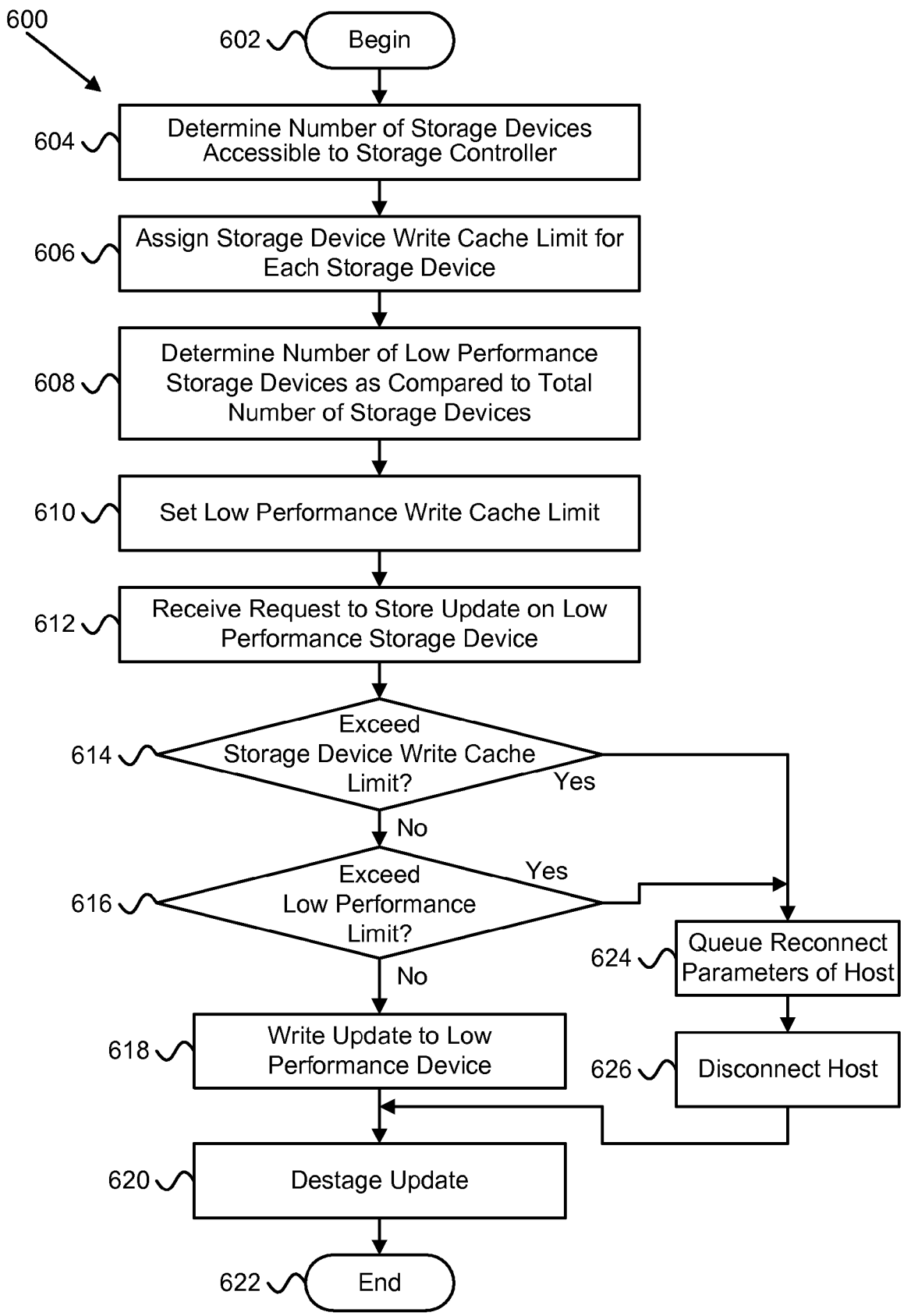
FIG. 6 is a schematic flow chart diagram illustrating another embodiment of a method for preventing write starvation in a storage controller with access to low performance storage devices in accordance with the present invention.

FIG. 6 is a schematic flow chart diagram illustrating another embodiment of a method 600 for preventing write starvation in a storage controller 102 with access to low performance storage devices 106 in accordance with the present invention. The method 600 begins 602 and the storage device allocation module 302 determines 604 the number of storage devices 104, 106 or ranks accessible to the storage controller 102. The storage device allocation module 302 assigns 506 a storage device write cache limit 202 for each storage device 104, 106.

The low performance write cache limit module 304 determines 608 the number of low performance storage devices 106a,b, . . . n accessible to the storage controller 102. The low performance write cache limit module 304 sets 610 a low performance write cache limit 204 based on the number of ranks of low performance storage devices 106 and size or available space in the write cache 118. The request module 402 receives 612 a request to store an update on a low performance storage device 106a. The write cache storage module 404 determines 614 if the update plus an amount of write cache 118 filled with other updates intended for storage on the low performance storage device 106a will exceed the storage device write cache limit 202.

If the write cache storage module 404 determines 614 that the storage device write cache limit 202 will not be exceeded, the write cache storage module 404 determines 616 if the update plus the amount of write cache 118 filled with updates intended for any of the low performance storage devices 106 will exceed the low performance write cache limit 204. If the write cache storage module 404 determines 616 that the update plus the amount of write cache 118 filled with updates intended for any of the low performance storage devices 106 will not exceed the low performance write cache limit 204, the write cache storage module 404 writes 618 the update to the write cache 118. The destage module 406 destages 620 the update to the intended low performance storage device 106 and the method 600 ends 622.

If the write cache storage module 404 determines that the update will exceed the storage device write cache limit 202 or low performance write cache limit 204, the delay module 408 queues 624 parameters required to reconnect the requesting host 108 and disconnects 626 the host 108. The destage module 406 destages 620 an update to a storage device 104, 106 and the method 600 ends 622. Subsequent request to store an update typically would not require assigning storage device write cache limits 202 or a low performance write cache limit 204, but would typically start with the request module 402 receiving 612 a request.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed for preventing write starvation in a storage controller with access to low performance storage devices, the operations of the computer program product comprising:

assigning a storage device write cache limit for each storage device accessible to a storage controller, the storage device write cache limit comprising a maximum amount of a write cache of the storage controller available to a storage device for a write operation, wherein at least one storage device comprises a low performance storage device and a total amount of storage available to the storage devices comprises an amount greater than a total storage capacity of the write cache;

setting a low performance write cache limit, the low performance write cache limit comprising a total amount of write cache available for use by low performance storage devices for write operations, wherein the amount of write cache available to the low performance storage devices comprises an amount less than the total storage capacity of the write cache, receiving a request to store an update to a low performance storage device; and storing the update in the write cache in response to the size of the update plus an amount of the write cache occupied by updates ready to be written to the low performance storage device being less than or equal to the storage device write cache limit; and the size of the update plus an amount of the write cache occupied by updates ready to be written to the low performance storage devices accessible to the storage controller being less than or equal to the low performance write cache limit; and writing the update to the low performance storage device.

2. The computer program product of claim 1, wherein the low performance storage device comprises a storage device configured to decrease performance in response to a heavy workload.

3. The computer program product of claim 1, wherein the low performance storage device comprises a nearline storage device.

4. The computer program product of claim 1, wherein the write cache comprises non-volatile storage.

5. The computer program product of claim 1, further comprising:

receiving a request to store an update to a low performance storage device; and delaying storage of the update in response to one of the size of the update plus an amount of the write cache occupied by updates ready to be written to the low performance storage device being greater than the storage device write cache limit; and the size of the update plus an amount of the write cache occupied by updates ready to be written to the low performance storage devices accessible to the storage controller being greater than the low performance write cache limit.

6. The computer program product of claim 5, wherein delaying storage of the update further comprises queuing reconnect parameters required to reconnect a host requesting the update and disconnecting from the host.

7. The computer program product of claim 1, wherein at least one storage device comprises a Redundant Array of Inexpensive Disks ("RAID") array.

8. The computer program product of claim 1, wherein the maximum amount of write cache available to each storage device is greater than the total storage capacity of the write cache divided by a total number of storage devices accessible to the storage controller.

9. The computer program product of claim 1, wherein the storage device write cache limit of each storage device accessible to the storage controller comprises an equal amount for each storage device.

10. The computer program product of claim 1, wherein the storage device write cache limit of each storage device accessible to the storage controller comprises a different limit for each storage device.

11. The computer program product of claim 1, wherein the storage device write cache limit of a storage device is limited to 25% of the total storage capacity of the write cache when four or more storage devices are accessible to the storage controller.

12. The computer program product of claim 1, wherein the low performance write cache limit does not exceed half of the total storage capacity of the write cache when two or more low performance storage devices are accessible to the storage controller.

13. An apparatus to prevent write starvation in a storage controller with access to low performance storage devices, the apparatus comprising:
 a storage device allocation module configured to assign a storage device write cache limit for each storage device accessible to a storage controller, the storage device write cache limit comprising a maximum amount of write cache of the storage controller available to a storage device for a write operation, wherein at least one storage device comprises a low performance storage device and a total amount of storage available to the storage devices comprises an amount greater than a total storage capacity of the write cache;
 a low performance write cache limit module configured to set a low performance write cache limit, wherein the low performance write cache limit comprises a total amount of write cache available for use by low performance storage devices for write operations, wherein the amount of write cache available to the low performance storage devices comprises an amount less than the total storage capacity of the write cache;
 a request module configured to receive a request to store an update to a low performance storage device;
 a write cache storage module configured to store the update in the write cache in response to
  the size of the update plus an amount of the write cache occupied by updates ready to be written to the low performance storage device being less than or equal to the storage device write cache limit; and
  the size of the update plus an amount of the write cache occupied by updates ready to be written to the low performance storage devices accessible to the storage controller being less than or equal to the low performance write cache limit; and
 a destage module configured to destage the update to the low performance storage device.

14. The apparatus of claim 13, wherein the storage controller further comprises a volatile cache and wherein the write cache storage module stores a copy of the update in the write cache and a copy of the update in the volatile cache and the destage module destages the update to the low performance storage device from the volatile cache.

15. The apparatus of claim 13, further comprising a delay module configured to delay storage of the update in response to one of
 the size of the update plus an amount of the write cache occupied by updates ready to be written to the low performance storage device being greater than the storage device write cache limit; and
 the size of the update plus an amount of the write cache occupied by updates ready to be written to the low performance storage devices accessible to the storage controller being greater than the low performance write cache limit.

16. A system to prevent write starvation in a storage controller with access to low performance storage devices, the system comprising:
 a plurality of storage devices, wherein at least one of the storage devices comprises a low performance storage device; and
 a storage controller connected to the plurality of storage devices, the storage controller comprising
  a storage device allocation module configured to assign a storage device write cache limit for each storage device accessible to the storage controller, the storage device write cache limit comprising a maximum amount of write cache of the storage controller available to a storage device for a write operation, wherein at least one storage device comprises a low performance storage device and a total amount of storage available to the storage devices comprises an amount greater than a total storage capacity of the write cache;
  a low performance write cache limit module configured to set a low performance write cache limit, wherein the low performance write cache limit comprises a total amount of write cache available for use by low performance storage devices for write operations, wherein the amount of write cache available to the low performance storage devices comprises an amount less than the total storage capacity of the write cache
  a request module configured to receive a request to store an update to a low performance storage device;
  a write cache storage module configured to store the update in the write cache in response to
   the size of the update plus an amount of the write cache occupied by updates ready to be written to the low performance storage device being less than or equal to the storage device write cache limit; and
   the size of the update plus an amount of the write cache occupied by updates ready to be written to the low performance storage devices accessible to the storage controller being less than or equal to the low performance write cache limit; and
  a destage module configured to destage the update to the low performance storage device.

17. The system of claim 16, further comprising a host with access to at least one of the storage devices through the storage controller for writing updates to the at least one storage device.

18. The system of claim 16, wherein a host communicates with the storage controller over a storage area network.

* * * * *